(12) United States Patent
Boettger (10) Patent No.: US 10,779,157 B2
(45) Date of Patent: Sep. 15, 2020

(54) METHODS AND APPARATUS FOR ACCESSING SERVICES OF MULTIPLE WIRELESS NETWORKS VIA A SINGLE RADIO ACCESS NETWORK

(71) Applicant: Apple Inc., Cupertino, CA (US)

(72) Inventor: David Boettger, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/101,935

(22) Filed: Aug. 13, 2018

(65) Prior Publication Data

US 2019/0098487 A1 Mar. 28, 2019

Related U.S. Application Data

(60) Provisional application No. 62/564,784, filed on Sep. 28, 2017.

(51) Int. Cl.
| | |
|---|---|
| *H04L 29/06* | (2006.01) |
| *H04W 12/02* | (2009.01) |
| *H04W 8/18* | (2009.01) |
| *H04W 88/06* | (2009.01) |
| *H04W 48/08* | (2009.01) |
| *H04W 76/12* | (2018.01) |
| *H04W 28/06* | (2009.01) |
| *H04W 76/15* | (2018.01) |

(52) U.S. Cl.
CPC .......... *H04W 8/183* (2013.01); *H04L 65/102* (2013.01); *H04L 65/1016* (2013.01); *H04L 65/1036* (2013.01); *H04W 28/065* (2013.01); *H04W 48/08* (2013.01); *H04W 76/12* (2018.02); *H04W 76/15* (2018.02); *H04W 88/06* (2013.01)

(58) Field of Classification Search
CPC ..................................................... H04W 8/183
See application file for complete search history.

(56) References Cited

U.S. PATENT DOCUMENTS

| | | | |
|---|---|---|---|
| 2016/0242234 A1* | 8/2016 | Takeda | H04M 3/00 |
| 2017/0118255 A1* | 3/2017 | Shi et al. | H04W 8/183 |
| 2017/0070877 A1* | 4/2017 | Tsai et al. | H04L 65/1073 |
| 2017/0164185 A1* | 6/2017 | Betti | H04W 56/00 |

* cited by examiner

*Primary Examiner* — Gary Lafontant
(74) *Attorney, Agent, or Firm* — Dickinson Wright RLLP (57) ABSTRACT

Apparatus and methods to access services of multiple wireless networks by a wireless device are disclosed. The wireless device attaches to a primary wireless network using a primary subscriber identity module (SIM) or electronic SIM (eSIM) via a radio access network (RAN) of the primary wireless network; establishes (i) a context for Internet Protocol (IP) network data connections using the primary SIM or eSIM and (ii) a packet data network (PDN) connection via the RAN of the primary wireless network to a gateway of a secondary wireless network using a secondary SIM or eSIM; and registers for access to services of the secondary wireless network with a server of the secondary wireless network using the secondary SIM or eSIM. The wireless device can access services of both the primary wireless network and the secondary wireless network simultaneously via the RAN of the primary wireless network.

17 Claims, 8 Drawing Sheets

| Case | Primary SIM/eSIM State (via Primary Wireless Network) | Secondary SIM/eSIM MO/MT SMS/Voice Capability |
|---|---|---|
| 1 | Primary SIM/eSIM Detached | No |
| 2 | Primary SIM/eSIM Idle on LTE | Yes |
| 3 | Primary SIM/eSIM Connected on LTE Data | Yes |
| 4 | Primary SIM/eSIM Connected on LTE Voice (VoLTE) | Yes |
| 5 | Primary SIM/eSIM Connected on LTE Voice (CSFB) | Yes (WCDMA), No (GSM) |
| 6 | Primary SIM/eSIM Idle on UMTS | Yes |
| 7 | Primary SIM/eSIM Connected on HSPA | Yes |
| 8 | Primary SIM/eSIM Connected on WCDMA Voice | Yes (Multi-RAB) |
| 9 | Primary SIM/eSIM Idle on GSM | Yes |
| 10 | Primary SIM/eSIM Connected on EGPRS | Yes |
| 11 | Primary SIM/eSIM Connected on GSM Voice | No |

METHODS AND APPARATUS FOR ACCESSING SERVICES OF MULTIPLE WIRELESS NETWORKS VIA A SINGLE RADIO ACCESS NETWORK

CROSS-REFERENCE TO RELATED APPLICATIONS

The present application claims the benefit of U.S. Provisional Application No. 62/564,784, entitled "METHODS AND APPARATUS FOR ACCESSING SERVICES OF MULTIPLE WIRELESS NETWORKS VIA A SINGLE RADIO ACCESS NETWORK," filed Sep. 28, 2017, the content of which is incorporated herein by reference in its entirety for all purposes.

FIELD

The described embodiments generally relate to wireless communications, and more particularly, to methods and apparatus to support access to services of multiple wireless networks via a single radio access network, where services for different wireless networks are associated with different subscriber identity modules (SIMs) for a wireless device. Access may be based on registration with an Internet Protocol Multimedia Subsystem (IMS).

BACKGROUND

Fourth generation (4G) cellular wireless networks employing newer radio access technology that implements one or more $3^{rd}$ Generation Partnership Project (3GPP) Long Term Evolution (LTE) and LTE Advanced (LTE-A) standards are rapidly being developed and deployed by network operators worldwide. The newer cellular wireless networks provide a range of packet-based services for both voice and data in parallel with legacy second generation (2G) and third generation (3G) wireless networks. A user of a wireless device accesses services offered by a wireless network service provider based on service subscriptions controlled by authentication credentials included in a profile, also referred to as a subscriber identity module (SIM) or an electronic SIM (eSIM), which can be included in a removable universal integrated circuit card (UICC) or in an embedded UICC (eUICC) of the wireless device. With a removable UICC and an "unlocked" wireless device, a user can access different services by replacing the UICC/SIM combination. Wireless devices that accommodate multiple UICCs/SIMs provide for multiple subscriber identities to be used by the same wireless device to access different services, including different wireless networks depending on the radio access technologies (RATs) supported by the wireless device. Hardware complexity of the wireless device increases with the number of different wireless RATs to support, and certain wireless RATs or deployments can conflict with each other disallowing simultaneous use of two different RATs. Thus, there exists a need for methods and apparatus to allow a user to maintain parallel service using multiple different SIM/eSIM profiles at the same time with minimal hardware and/or software complexity.

SUMMARY

Apparatus and methods to support access to services of multiple wireless networks via a single radio access network by a wireless device are disclosed. The services for different wireless networks are associated with different subscriber identity modules (SIMs) and/or electronic SIMs (eSIMs) in the wireless device. The wireless device includes a primary SIM/eSIM that provides for access to wireless services of a first wireless service provider via a first cellular wireless network that includes a first radio access network using a first radio access technology and a first core network. The wireless device also includes a secondary SIM/eSIM that provides for access to wireless services of a second wireless service provider via a second cellular wireless network that includes a second radio access network using a second radio access technology and a second core network. The wireless device is configured to access wireless services of the second wireless service provider via the first radio access network (associated with the primary SIM/eSIM) rather than via the second radio access network (associated with the secondary SIM/eSIM). The wireless device attaches to the first cellular wireless network using the primary SIM/eSIM and establishes a context for packet data network (PDN) connections, e.g., by establishing bearer to a PDN gateway that provides for interconnection to the Internet. In some embodiments, the PDN gateway is addressable by an Access Point Name (APN) used for communicating with the Internet by the wireless device using the primary SIM, e.g., for packet data transfer. The wireless device subsequently establishes a tunneled connection to an evolved Packet Data Gateway (ePDG) of the second cellular wireless network via the Internet PDN gateway of the first cellular wireless network. The wireless device registers for wireless services with an Internet Protocol Multimedia Subsystem (IMS) server via the tunneled connection with the ePDG of the second cellular wireless network. The wireless device can access wireless services managed by the core network of the second cellular wireless network through the tunneled data connection that traverses the radio access network of the first cellular wireless network. The wireless device can originate and receive voice calls and short message service (SMS) messages from the core network of the second cellular wireless network using the tunneled data connection through the first cellular wireless network. Wireless circuitry of the wireless device need not be compatible with the radio access technology of the second radio access network of the second cellular wireless network, as the tunneled data connection is through the first radio access network of the first cellular wireless network and need only be compatible with the radio access technology of the first radio access network.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Representative examples for accessing wireless services using multiple subscriber identity modules (SIMs) and/or electronic SIMs (eSIMs) are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) Long Term Evolution (LTE) and LTE Advanced (LTE-A), fifth generation (5G) new radio (NR), or similar "later generation" cellular wireless access communication capabilities.

Additionally, it should be understood that the UEs described herein may be configured as multi-mode wireless communication devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, LTE-A, and 5G NR standards or 3GPP2's CDMA2000 (1×RTT, 2×EV-DO, HRPD, eHRPD) standards. Multi-mode UEs can also support communication using wireless local area networking protocols, e.g., the Institute of Electrical and Electronics Engineers (IEEE) 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

Users of wireless communication devices can seek to access services provided by different cellular wireless network service providers through different cellular wireless networks. A user can obtain and use a variety of UICCs, also referred to as SIM cards, that provide for access to services for different service providers, such as when travelling to regions in which one or more services accessed via a local wireless network provider may be more cost effective than by using roaming services from a home wireless network provider. Use of multiple SIMs (and/or eSIMs) allows for flexibility and convenience to access a broader variety of services in a single wireless communication device. A user may mix use of personal and business accounts or different services provided by different wireless service providers. For example, a roaming user may have cost effective access to a data plan when roaming but expensive access to metered voice and SMS. As another example, a roaming user may obtain a SIM card for a local wireless network to access inexpensive data; however, substituting the local data SIM card in the wireless communication device for the home network SIM card can result in losing access to mobile terminated voice and SMS to the mobile number associated with the home network SIM. Furthermore, a user's region or wireless network provider may lack the capability to port mobile numbers between different wireless communication devices, resulting in the user using multiple wireless communication devices in parallel to allow for mobile originated or mobile terminated services for two (or more) different mobile numbers. A user may have a primary SIM card, e.g., provided by an employer for business use with a business mobile number, and a secondary SIM card, e.g., acquired by the user for personal use with a personal mobile number. As the personal mobile number may not be portable to use on the primary SIM card, the user may seek to continue to use the secondary SIM card, as deactivation of the secondary SIM card can result in loss of contact via the personal mobile number. A user can seek to access services provided by the secondary SIM card and by the primary SIM card using a single wireless communication device. The user seeks to access services provided by the secondary SIM card and does not necessarily require access to a radio access network (RAN) of the cellular wireless network used by the wireless network provider associated with the secondary SIM card. Thus, as described further herein, use of an IP Multimedia Subsystem (IMS) server in the core network of the cellular wireless network managed by the wireless network provider associated with the secondary SIM card can allow for access to services via a radio access network of a cellular wireless network used by a wireless network provider associated with the primary SIM card. More simply, the approach described herein leverages IMS to access a secondary SIM's services via a primary SIM's RAN.

In some embodiments, a wireless communication device includes a primary SIM/eSIM and a secondary SIM/eSIM. Multiple SIMs and/or eSIMs can be accommodated based on hardware capabilities of the wireless communication device and/or requirements fro service access by wireless network service providers. In some embodiments, the wireless communication device includes a single slot in which a physical SIM card (UICC) can be inserted, such as a 4FF UICC, and also includes an embedded UICC (eUICC) on which one or more electronic SIMs (eSIMs) can be installed. In some embodiments, the primary SIM/eSIM is an eSIM on the eUICC and the secondary SIM/eSIM is a SIM on a physical UICC. In some embodiments, the secondary SIM/eSIM supports mobile originated (MO) and mobile terminated (MT) voice connections over a non-cellular wireless network, such as through an 802.11 wireless local area network (WLAN), which can also referred to as Wi-Fi calling. In addition, the secondary SIM/eSIM supports communication of MO SMS and MT SMS via a non-cellular wireless network connection, such as over a Wi-Fi connection. In some embodiments, the core network of the cellular wireless network with which the secondary SIM/eSIM is associated includes an IMS server with which the wireless communication device can register for services. In some embodiments, the second SIM's (or eSIM's) cellular wireless network includes an evolved Packet Data Network Gateway (ePDG) through which services of the core network of the second SIM's cellular wireless network can be accessed from an IP network connection.

In some embodiments, the user accesses services associated with the primary SIM/eSIM through a radio link to a radio access network of a wireless service provider associated with the primary SIM/eSIM. In some embodiments, the user access services associated with the secondary SIM/eSIM through a data connection established using the primary SIM/eSIM, e.g., by establishing a data connection through a packet data network (PDN) gateway of the wireless service provider associated with the primary SIM/eSIM across an IP network to an evolved PDN gateway (ePDG) of a core network of the wireless service provider associated with the secondary SIM/eSIM. The wireless communication device can establish a data connection context, e.g., a packet data protocol (PDP) context, for data connections for the primary SIM after and/or during association with the wireless network of the primary SIM/eSIM. Using a data connection, e.g., a secure tunnel, to the ePDG of the wireless network associated with the secondary SIM/eSIM, the wireless communication device can register for access to services, e.g., voice connections and/or SMS, with an IP Multimedia Subsystem (IMS) server of the core network of the wireless service provider associated with the secondary SIM. The wireless communication device, once registered with the IMS server of the core network associated with the secondary SIM/eSIM can originate and receive both voice connections and text messaging (SMS) using a data connection that traverses the radio access network (RAN) of the wireless network associated with the primary SIM/eSIM. Advantageously, wireless circuitry hardware of the wireless communication device does not require compatibility with a RAN of the wireless network associated with the secondary SIM/eSIM. Similarly, radio frequency bands and/or channels used by the RANs of the wireless networks for the primary SIM/eSIM and the secondary SIM/eSIM need not be compatible. A data connection via the RAN of the wireless network of the primary SIM/eSIM is sufficient to send and receive data packets, which can include data packets used for voice connections, such as for voice over IP (VoIP), voice over LTE (VoLTE), Facetime® audio, or similar packet voice connections. The credentials of the secondary SIM/eSIM and registration with the IMS server of the wireless network associated with the secondary SIM/eSIM allow for access to services of the core network associated with the secondary SIM/eSIM without requiring access via the RAN of the wireless network associated with the secondary SIM/eSIM.

Use of IMS for dual SIM/eSIM allows the wireless communication device to access services for both wireless networks simultaneously without requiring complex switching between radio access networks or dual transceivers. Compatibility requirements between radio access technologies (RATs) and/or radio frequency bands of two different RANs for two different wireless networks are also avoided. The solution described herein provides greater power efficiency in single transceiver wireless communication devices than a dual SIM dual standby (DSDS) or dual SIM dual active (DSDA) solution that uses multi-RAT paging channel monitoring. Transceiver hardware complexity and/or software complexity is reduced as well. A higher layer application processor can establish a data connection to allow for voice and/or text message connections without changes to underlying lower layer baseband processor functionality.

Figure 1:
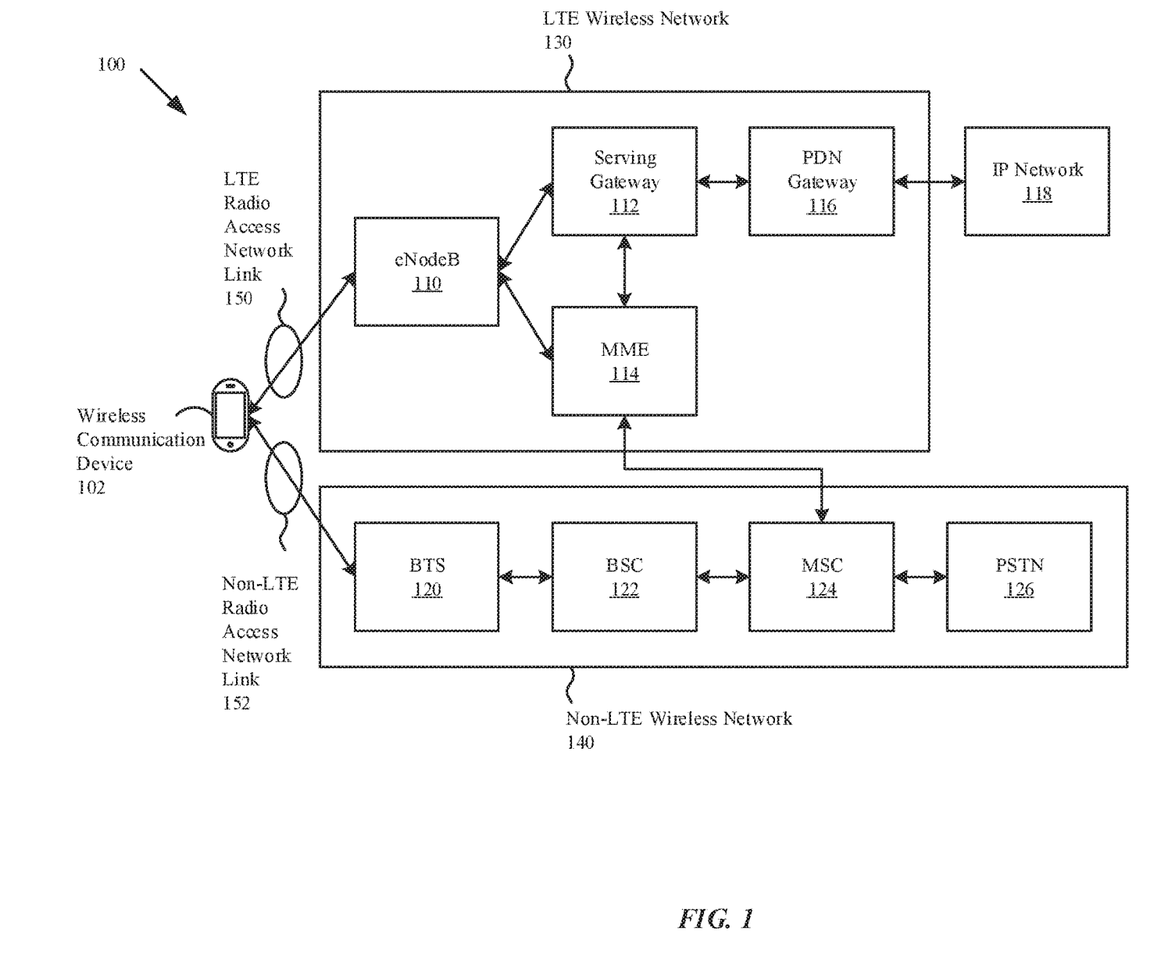
FIG. 1 illustrates an example of a wireless communication device connected via parallel radio links to an LTE wireless network and a non-LTE wireless network, in accordance with some embodiments.

FIG. 1 illustrates a diagram 100 of a wireless communication device 102 in communication with an LTE wireless network 130, which can also be an LTE-A or other next generation cellular wireless network, and a non-LTE wireless network 140, e.g., a legacy 2G GSM or 3G UMTS wireless network. The wireless communication device 102 can be configured to communicate via an LTE radio access network (RAN) link 150 to an eNodeB 110 in the RAN of the LTE wireless network 130 and separately to communicate via a non-LTE RAN link 152 to a base transceiver station (BTS) 120 connected to a base station controller (BSC) 122, which together can form a base station subsystem, in the RAN of the non-LTE wireless network 140. The LTE wireless network 130 can connect to an Internet Protocol (IP) network 118 via a Packet Data Network (PDN) gateway 116 that communicates with a serving gateway 112 to which the eNodeB 110 of the RAN of the LTE wireless network 130 communicates. The eNodeB 110 also interacts with a Mobility Management Entity (MME) for controlling access to services for the wireless communication device 102 on the LTE wireless network 130. The non-LTE wireless network 140 can connect to a circuit-switched based public switched telephone network (PSTN) 126 through a mobile switching center (MSC) 124. The non-LTE wireless network 140 can provide circuit-switched services, e.g., circuit-switched voice connections for the wireless communication device 102, such as used in a circuit-switched fallback (CSFB) procedure when the LTE wireless network 130 does not support a voice over LTE (VoLTE) service. The MSC 124 of the non-LTE wireless network 140 can be interconnected to the MME 114 of the LTE wireless network 130 to coordinate call signaling for the wireless communication device 102. FIG. 1 illustrates a representative interconnection between wireless networks, such as the non-LTE wireless network 140 and the LTE wireless network 130 to provide for coordination of wireless services between them. Wireless service providers typically deploy newer technology wireless networks, e.g., the LTE wireless network 130, overlaying older technology wireless networks, e.g., the non-LTE wireless network 140, and a single SIM version of the wireless communication device 102 can be configured to communicate with either wireless network. For multi-SIM versions of the wireless communication device 102, with sufficient wireless circuitry, such as when the wireless communication device 102 includes dual transceivers, or with software configurable switchable transceivers, the multi-SIM version of the wireless communication device 102 can be configured to communicate with two different wireless networks. Compatibility of the radio access technology used by the two different wireless networks can limit the ability for the wireless communication device 102 to use different subscriber identity modules (SIMs) and/or electronic SIMs (eSIMs). As described further herein, an IP Multimedia Subsystem (IMS) based solution can provide for a wireless communication device 102 to connect with multiple different wireless networks without the need for multiple transceivers or complex switching software.

Figure 2A:
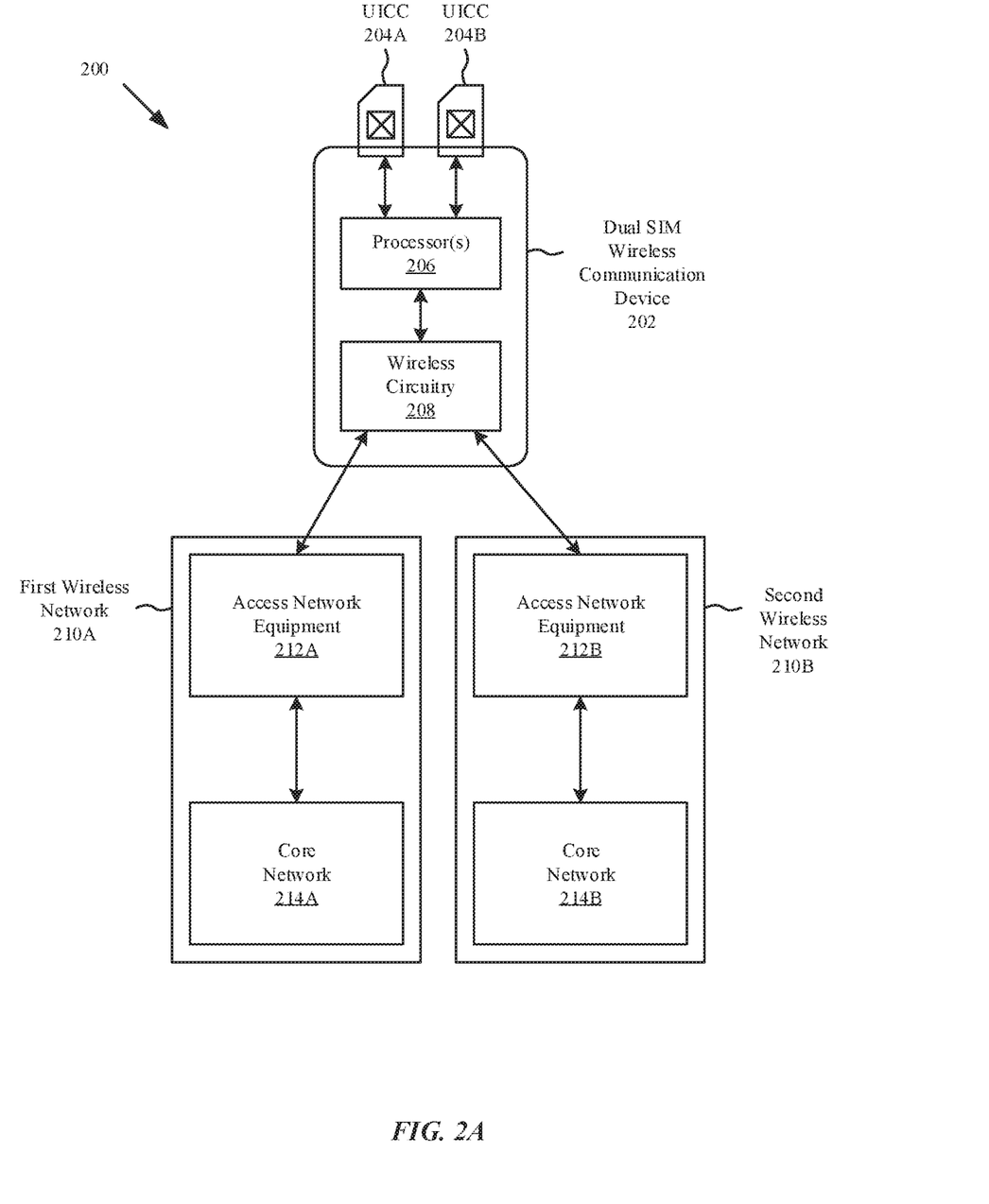
FIG. 2A illustrates an example of a dual subscriber identity module (SIM) wireless communication device connected in parallel with two wireless networks, in accordance with some embodiments.

FIG. 2A illustrates a diagram 200 of components of a dual SIM wireless communication device 202 including one or more processor(s) 206 and wireless circuitry 208 that provides for wireless radio frequency (RF) connections between the dual SIM wireless communication device 202 and a first wireless network 210A and a second wireless network 210B. In some embodiments, the wireless circuitry 208 includes one or more baseband processor(s), and a set of RF analog front-end circuitry. In some embodiments, the wireless circuitry 208 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 208 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more of the first and second wireless networks 210A/B.

The processor(s) 206 and the wireless circuitry 208 can be configured to perform and/or control performance of one or more functionalities of the dual SIM wireless communication device 202, in accordance with various implementations. The processor(s) 206 and the wireless circuitry 208 can provide functionality for coordinating hardware/software resources in the dual SIM wireless communication device 202 to provide for connections to one or more of the wireless networks 210A/B. The processor(s) 206 may include multiple processors of different types that can provide for both wireless communication management and/or higher layer functions, e.g., one or more of the processor(s) 206 may be configured to perform data processing, application execution, and/or other device functions according to one or more embodiments of the disclosure. The dual SIM wireless communication device 202, or portions or components thereof, such as processor(s) 206, can include one or more chipsets, which can respectively include any number of coupled microchips thereon.

In some embodiments, the processor(s) 206 may be configured in a variety of different forms. For example, the processor(s) 206 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 206 of the dual SIM wireless communication device 202 can be coupled to and/or configured in operative communication with each other, and these components may be collectively configured to perform mobility management functions associated with multiple subscriber identities associated with wireless services provided via multiple wireless networks. In some implementations, the processor(s) 206 can be configured to execute instructions that may be stored in memory, or that can otherwise be accessible to the processor(s) 206 in some other device memory. As such, whether configured as, or in conjunction with, hardware or a combination of hardware and software, the processor(s) 206 may be capable of performing operations according to various implementations described herein, when configured accordingly. In various embodiments, memory in the dual SIM wireless communication device 202 may include multiple memory devices that can be associated with any common volatile or non-volatile memory type. In some scenarios, the memory may be associated with a non-transitory computer-readable storage medium that can store various computer program instructions, which may be executed by the processor(s) 206 during normal program executions. In this regard, the memory can be configured to store information, data, applications, instructions, or the like, for enabling the wireless communication device to carry out various functions in accordance with one or more embodiments of the disclosure. In some implementations, the memory may be in communication with, and/or otherwise coupled to, the processor(s) 206, as well as one or more system buses for passing information between and amongst the different device components of the dual SIM wireless communication device 202.

The dual SIM wireless communication device 202 illustrated in FIG. 2A includes two removable UICCs 204A/B, which can be inserted and removed from the dual SIM wireless communication device 202 together or independently. Each UICC 204A/B includes at least one subscriber identity module (SIM), which can be embodied as a software/firmware program installed on the UICC 204A/B. Removable UICCs 204A/B can provide a user of the dual SIM wireless communication device 202 the ability to replace a UICC to change services, provided the dual SIM wireless communication device 202 supports such flexibility (e.g., an "unlocked" device that is not "locked" to a particular wireless network operator or service provider). Hardware complexity and/or a size of a wireless communication device can limit the ability to include multiple UICC slots, and thus additional arrangements for wireless communication devices are illustrated further herein in FIG. 2C to include multiple SIMs on a single UICC and/or electronic SIMs (eSIMs) on an embedded UICC or combinations thereof. The dual SIM wireless communication device 202, in some embodiments, can register with two different wireless networks, e.g., the first and second wireless networks 210A/B, simultaneously. The wireless circuitry 208 of the dual SIM wireless communication device 202 can be configured to register with and/or establish a connection with the first wireless network 210A via access network equipment 212A, which interfaces with a core network 214A. The wireless circuitry 208 of the dual SIM wireless communication device 202 can also be configured to register with and/or establish a connection with the second wireless network 210B via access network equipment 212B, which interfaces with a core network 214B. In some embodiments, the wireless circuitry 208 of the dual SIM wireless communication device 202 supports simultaneous transmission and reception to both the first and second wireless networks 210A/B. In some embodiments, the wireless circuitry 208 of the dual SIM wireless communication device 202 supports transmission and reception to only one of the first and second wireless networks 210A/B at a time. In some embodiments, the wireless circuitry 208 of the dual SIM wireless communication device 202 supports transmission to only one of the first and second wireless networks 210A/B at a time and reception from one or both of the first and second wireless networks 210A/B. As the dual SIM wireless communication device 202 can register with two different wireless networks simultaneously via two different subscriptions, the dual SIM wireless communication device 202 can appear as two distinct devices (each associated with a different number, user, and/or subscription). A dual SIM wireless communication device 202 that can connect to only one wireless network at a time but can monitor and/or receive communication from two wireless networks with which it is registered can be referred to as a "Dual SIM, Dual Standby" (DSDS) wireless communication device. A dual SIM wireless communication device 202 that can connect to two wireless networks simultaneously using two different subscriber identities can be referred to as a "Dual SIM, Dual Active" (DSDA) wireless communication device. In general the dual SIM wireless communication device 202 can be referred to as a "DSDx" wireless communication device, where "x" can indicate either "S" for "standby" or "A" or "active". While the dual SIM wireless communication device 202 provides for connection to two different cellular wireless networks, some wireless communication devices can also provide for connections via a cellular wireless network and via a non-cellular wireless network simultaneously as further discussed herein with respect to FIG. 2B.

It should be appreciated that not all of the components, device elements, and hardware illustrated in and described with respect to the dual SIM wireless communication device 202 of FIG. 2A may be essential to this disclosure, and thus, some of these items may be omitted, consolidated, or otherwise modified within reason. Additionally, in some implementations, the subject matter associated with the dual SIM wireless communication device 202 can be configured to include additional or substitute components, device elements, or hardware, beyond those depicted within the illustrations of FIG. 2A.

Figure 2B:
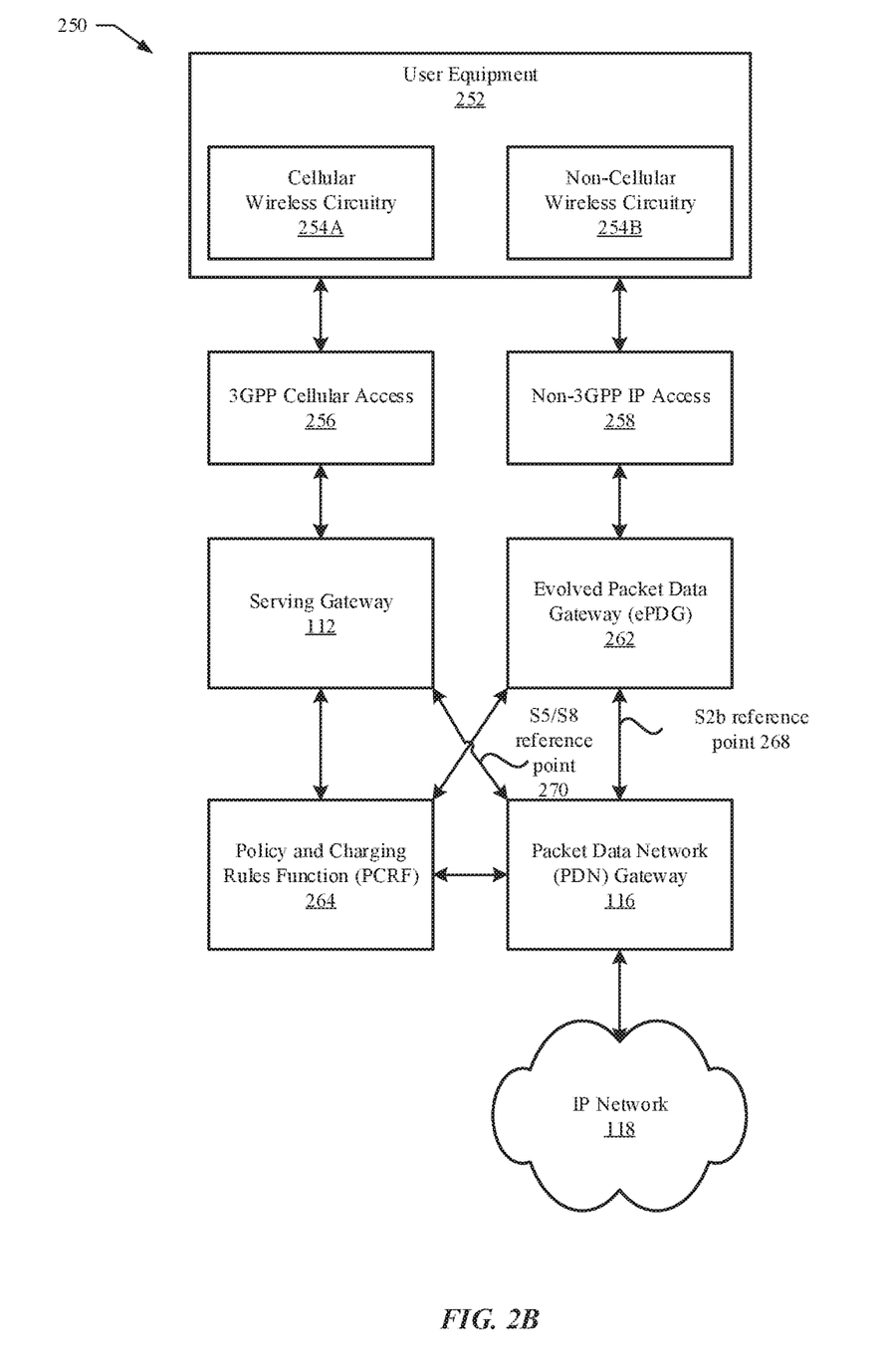
FIG. 2B illustrates an example set of network elements of cellular wireless networks, in accordance with some embodiments.

FIG. 2B illustrates a wireless system 250 that includes a UE 252 communicatively coupled to the IP network 118 through both a 3GPP cellular access 256 using cellular wireless circuitry 254A and a non-3GPP IP-based wireless access 258 using non-cellular wireless circuitry 254B. In some embodiments, the 3GPP cellular access 256 includes an evolved universal terrestrial access network (E-UTRAN) or other network elements of an LTE/LTE-A wireless network. In some embodiments, the non-3GPP IP access 258 includes a wireless local area network (WLAN) or portions thereof, e.g., a wireless access point, and thus the non-3GPP IP access 258 can also be referred to as a WLAN access. The UE 252 can be configured to connect to a packet data network (PDN) through the 3GPP cellular access 256 or the non-3GPP IP-based wireless access 258 independently or together via both the 3GPP cellular access 256 and the non-3GPP IP-based wireless access 258. The 3GPP cellular access 256 connects to a serving gateway (GW) 112, which connects to a PDN gateway 116 through an S5 reference point 270 for home network users or via an S8 reference point 270 for roaming network users. The PDN gateway 116 provides a connection to the IP network 118 through which a variety of services can be accessed. The non-3GPP IP access 258 connects to an evolved packet data gateway (ePDG) 262, which connects to the PDN gateway 116 through an S2b reference point 268 for an untrusted non-3GPP IP access 258 or through an S2a reference point (not shown) for a trusted non-3GPP IP access (not shown). Each of the serving gateway 112, the ePDG 262, and the PDN gateway 116 are also connected to a policy and charging rules function (PCRF) 264. In some embodiments, the ePDG 262 communicates requests from the PDN gateway 116 to the UE 252 and communicates responses from the UE 252 to the PDN gateway 116 to support communication with the IP network 118.

The 3GPP S2b reference point 268 between the ePDG 262 and the PDN gateway 116 provides a mechanism to allow the UE 252, when attached via an untrusted non-3GPP IP access network (e.g., non-3GPP IP access 258), to connect securely via a 3GPP evolved packet system (EPS) network to the IP network 118 and to access IP services via the secure connection. In some embodiments, the UE 252 can establish a secure connection, e.g., an Encapsulating Security Payload (ESP) tunnel based on an IP Security (IPsec) protocol, using an IKEv2 protocol signaling exchange between the UE 252 and the ePDG 262, which in turn can establish a secure tunnel, e.g., a Proxy Mobile IPv6 (PMIP) or GPRS Tunneling Protocol (GTP) tunnel, to the PDN gateway 116 when a session for the UE 252 is anchored.

Figure 2C:
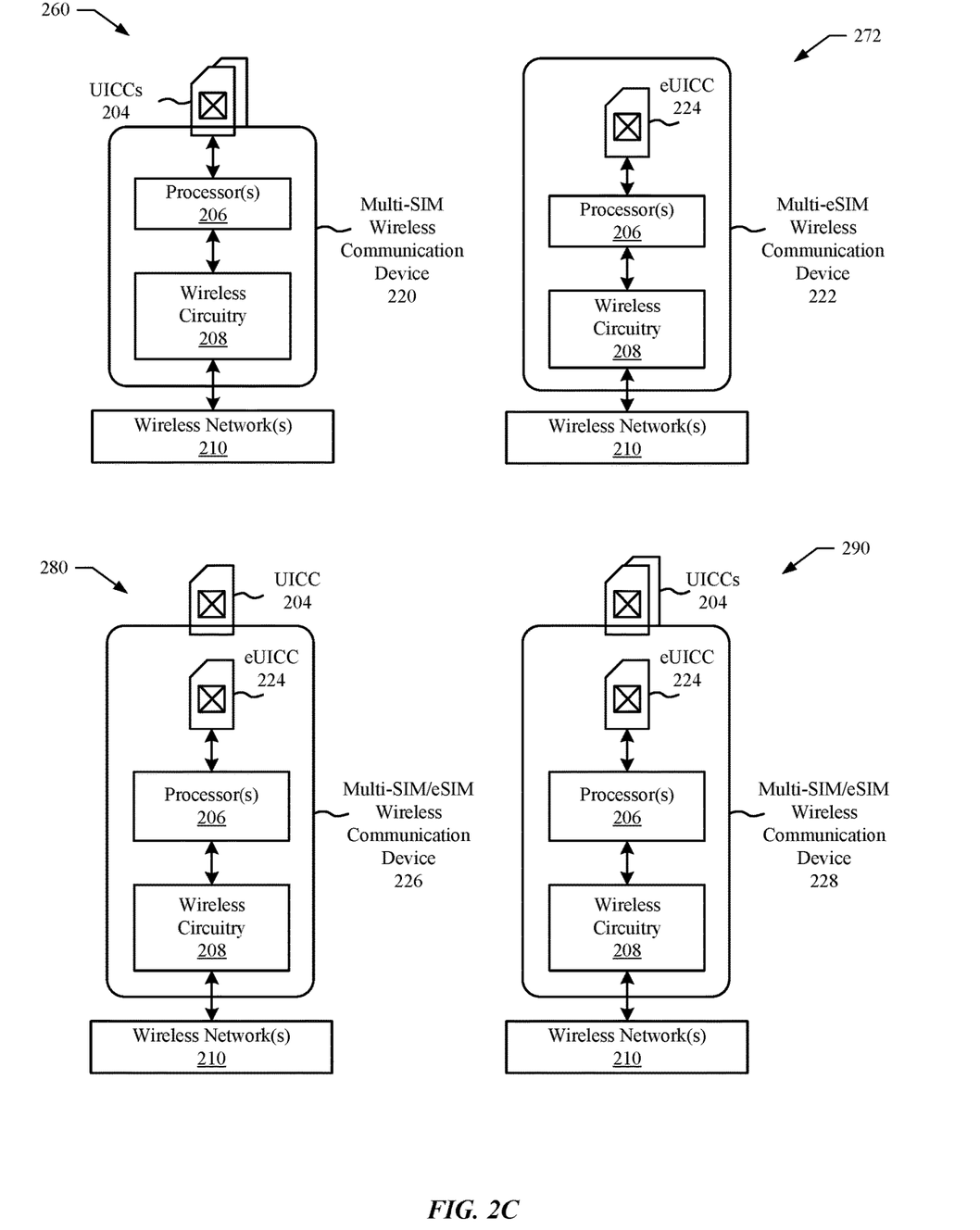
FIG. 2C illustrates examples of wireless communication devices that support multiple subscriber identities, in accordance with some embodiments.

FIG. 2C illustrates diagrams for additional wireless communication devices that support multiple subscriber identities using removable UICCs and/or embedded UICCs (eUICCs) with SIMs and/or eSIMs implemented thereon. As illustrated in diagram 260, a multi-SIM wireless communication device 220 includes multiple UICCs 204, which can be inserted and removed individually or together, and communicate with one or more processors 206 that connect to wireless circuitry 208 that provides for wireless communication with one or more wireless networks 210. As the physical size and design of the multi-SIM wireless communication device 220 can limit the number of UICCs 204 that can be supported, alternatively, as illustrated in diagram 272, a multi-eSIM wireless communication device 222 can include an embedded UICC (eUICC) 224 connected with the processor(s) 206 and to the wireless network(s) 210 via the wireless circuitry 208. The eUICC 224 can be built into the multi-eSIM wireless communication device 222 and can be not removable from the multi-eSIM wireless communication device 222, e.g., permanently affixed to a circuit board in the multi-eSIM wireless communication device 222. The eUICC 224 can be programmed such that one or more electronic SIMs (eSIMs) can be implemented on the eUICC 224. Each eSIM can be associated with a distinct subscriber identity and/or provide distinct services or subscriptions for a user of the multi-eSIM wireless communication device 222. Diagram 280 illustrates a diagram of a multi-SIM/eSIM wireless communication device 226 that includes a removable UICC 204, on which can be installed one or more SIMs, and an eUICC 224 on which one or more eSIMs can be installed. The combination of SIMs on the UICC 204 and/or eSIMs on the eUICC 224 can provide for connections to one or more wireless networks 210 using the wireless circuitry 208 under the control of the processor(s) 206 of the multi-SIM/eSIM wireless communication device 226. Diagram 290 illustrates another multi-SIM/eSIM wireless communication device 228 that includes multiple UICCs 204, on which one or more SIMs can be installed, and an eUICC 224, on which one or more eSIMs can be installed. The combination of SIMs on the UICCs 204 and/or eSIMs on the eUICC 224 can provide for connections to one or more wireless networks 210 using the wireless circuitry 208 under the control of the processor(s) 206 of the multi-SIM/eSIM wireless communication device 228.

In general, a wireless communication device 102 that supports multiple subscriber identities can include at least one UICC 204 or at least one eUICC 224 or both. Each UICC 204 can support one or more SIMs, and each eUICC 224 can support one or more eSIMs. A wireless communication device 102 that supports multiple subscriber identities, e.g., 202, 220, 222, 226, 228, can include a combination of SIMs and/or eSIMs to support communication with one or more wireless networks 210.

Figure 3:
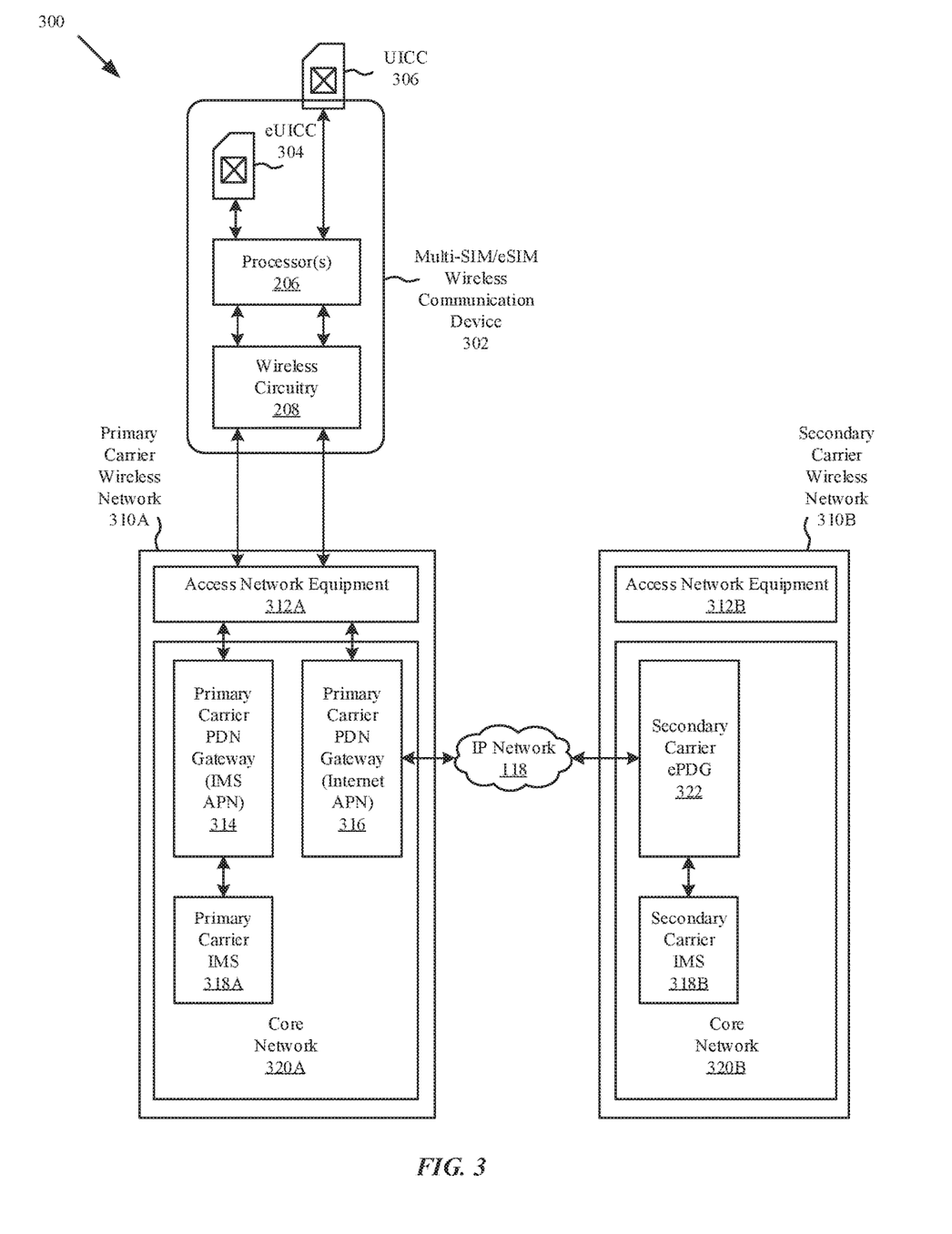
FIG. 3 illustrates an example of a wireless communication device using multiple subscriber identities to access services of distinct cellular wireless networks, in accordance with some embodiments.

FIG. 3 illustrates a diagram 300 of a multi-SIM/eSIM wireless communication device 302 that accesses services for multiple subscriber identities through a radio access link to access network equipment 312A of a primary carrier wireless network 310. The multi-SIM/eSIM wireless communication device 302 includes an eUICC 304, on which an eSIM, which will be referred to as a primary eSIM, is installed that provides access to services of the primary carrier wireless network 310A, and a UICC 306 on which a SIM, which will be referred to as a secondary SIM, is installed that provides access to services of a secondary carrier wireless network 310B. One or more processors 206 of the multi-SIM/eSIM wireless communication device 302 interact with wireless circuitry 208 to establish connections through the access network equipment 312A of the primary carrier wireless network 310A. Initially, the multi-SIM/eSIM wireless communication device 302 attaches to the primary carrier wireless network 310A. In some embodiments, the core network 320A of the primary carrier wireless network 310A includes a primary carrier IMS server 318A with which the multi-SIM/eSIM wireless communication device 302 registers for services of the primary carrier wireless network 310A. The primary carrier IMS server 318A is reachable by the multi-SIM/eSIM wireless communication device 302 via a primary carrier PDN gateway 314, e.g., using an IMS access point name (APN) known to the one or more processors 206 of the multi-SIM/eSIM wireless communication device 302. The multi-SIM/eSIM wireless communication device 302 can establish a context for data connections, e.g., a PDP context, via the access network equipment 312A to a primary carrier PDN gateway 316, e.g., using an Internet APN known to the one or more processors 206 of the multi-SIM/eSIM wireless communication device 302, to connect with the IP network 118. Through a data connection that traverses the access network equipment 312A of the primary carrier wireless network 310A and the primary carrier PDN gateway 316, the multi-SIM/eSIM wireless communication device 302 can reach a secondary carrier IMS server 318B via a secondary ePDG 322 in the core network 320B of the secondary carrier wireless network 310B using a tunneled connection over the IP network 118. The multi-SIM/eSIM wireless communication device 302 can register for access to services of the core network 320B of the secondary carrier wireless network 310B and need not establish a connection with or attach to the secondary carrier wireless network 310B via the access network equipment 312B of the secondary carrier wireless network 310B. The multi-SIM/eSIM wireless communication device 302 can originate voice connections or text messaging and/or receive voice connections or text messaging using services of the secondary carrier wireless network 310B through the data connection established with the primary carrier wireless network 310A via the access network equipment 312A. With the multi-SIM/eSIM wireless communication device 302 attached to the primary carrier wireless network 310A (and therefore registered for services with the primary carrier wireless network 310A) and also registered with the secondary carrier IMS server 318B of the secondary carrier wireless network 310B (via a data connection through the primary carrier wireless network 310A), the multi-SIM/eSIM wireless communication device 302 can access services of both the primary carrier wireless network 310A and the secondary carrier wireless network 310B simultaneously, e.g., with two different mobile numbers.

While the multi-SIM/eSIM wireless communication device 302 illustrated in FIG. 3 depicts a single UICC and single eUICC device, the same methods can be applied to any combination of UICC and/or eUICC device, such as those illustrated in FIG. 2C, or a single eUICC or single UICC device that include multiple SIMs (for UICCs) or multiple eSIMs (for eUICCs) to access two different sets of services provided by two different wireless networks. For example, a single eUICC device can include two different eSIMs provided by two different wireless service providers for access to two different wireless networks. One of the eSIMs can be used for access to a first wireless network including a data connection over which access to services of the second wireless network can be achieved when the core network of the second wireless network includes an IMS server for registering for service. A data connection through the first wireless network to the second wireless network allows for access to services of the second wireless network without establishing a connection through a radio access network of the second wireless network.

Figure 4:
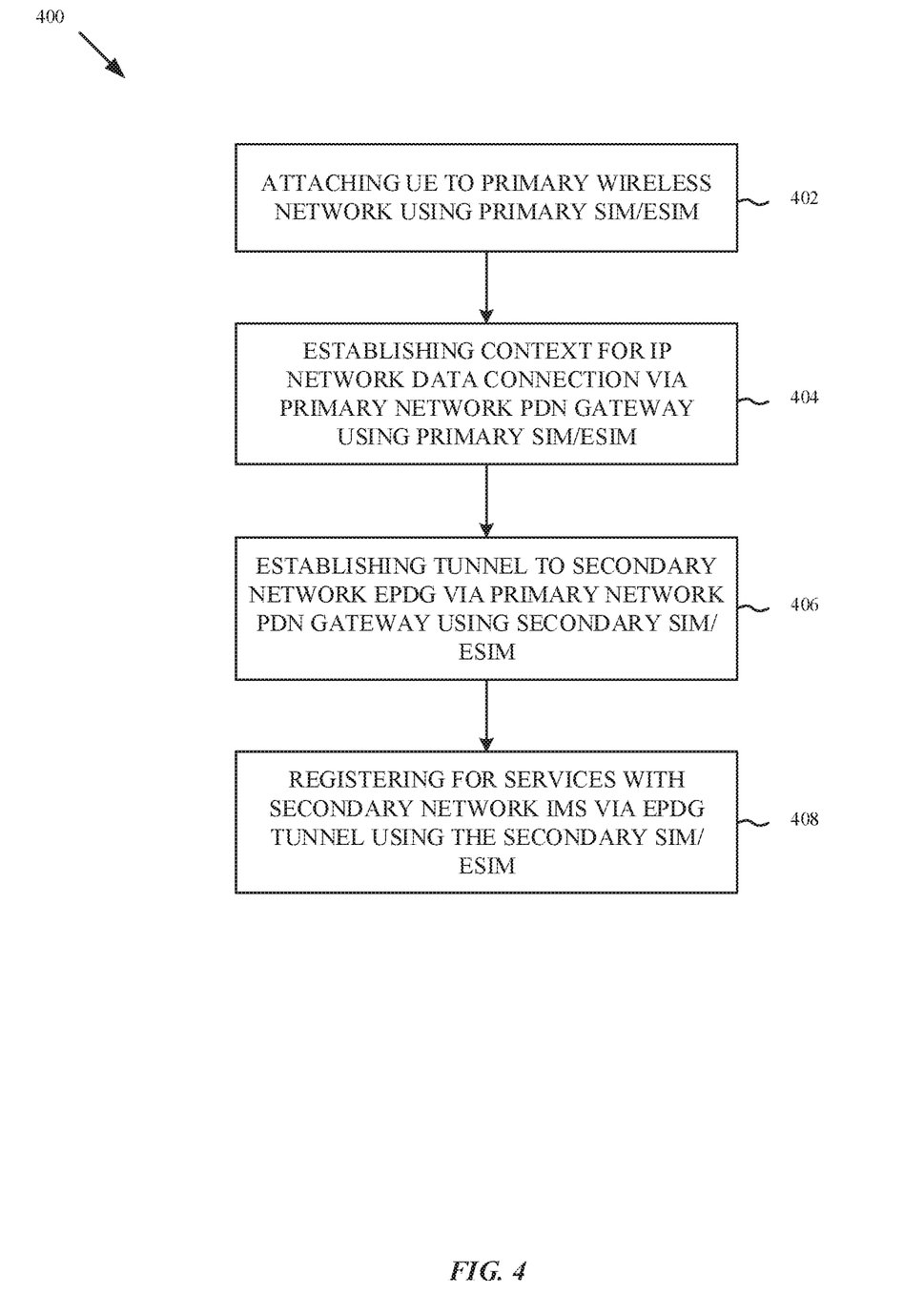
FIG. 4 illustrates an example method of configuring a wireless communication device to use multiple subscriber identities to access services of distinct cellular wireless networks, in accordance with some embodiments.

FIG. 4 illustrates a flowchart 400 of a representative method for establishing access to services of two different wireless networks through a single radio access network. At 402, a universal equipment (UE) attaches to a primary wireless network using a primary SIM/eSIM. At 404, the UE establishes a data context for an IP network data connection via a primary network PDN gateway of the primary wireless network using the primary SIM/eSIM. At 406, the UE establishes a tunnel to a secondary network ePDG via the primary network PDN gateway using a secondary SIM/eSIM. At 408, the UE registers for access to services of the secondary network by registering with the secondary network IMS server via an ePDG tunneled connection using the secondary SIM/eSIM.

Figure 5:
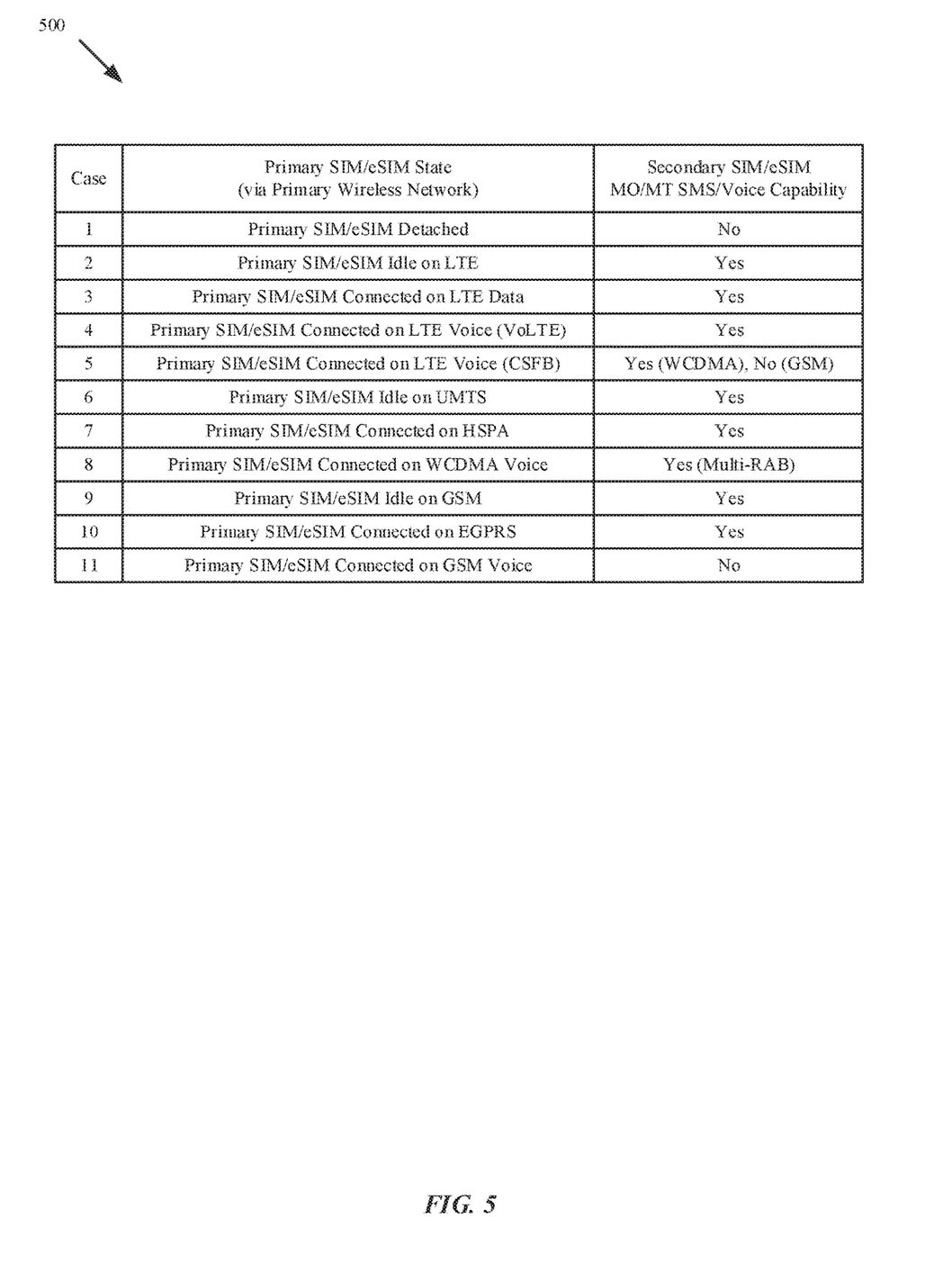
FIG. 5 illustrates an example table of capabilities for multiple subscriber identity use by a wireless communication device, in accordance with some embodiments.

FIG. 5 illustrates a table 500 of different states of a primary SIM/eSIM for access to services of a primary wireless network and whether access to services of a secondary network using a secondary SIM/eSIM can be achieved. Services can include mobile originated (MO) and mobile terminated (MT) voice connections, e.g., using a mobile number of the secondary wireless network associated with the secondary SIM/eSIM, and/or MO/MT text messaging, e.g., SMS, for the secondary wireless network via the radio access network of the primary wireless network. In case 1, when the primary SIM/eSIM is not attached to the primary wireless network, access to services of the secondary wireless network via the primary wireless network cannot occur. In case 2, when the primary SIM/eSIM is attached to and idle on the primary wireless network, which is an LTE wireless network, access to services of the secondary wireless network is possible. In case 3, when the primary SIM/eSIM is connected to the primary wireless network via a data connection, access to services of the secondary wireless network is possible. In case 4, when the primary SIM/eSIM is connected to the primary wireless network and using LTE voice, e.g., via a VoLTE connection through the primary wireless network, access to services of the secondary wireless network is possible. In case 5, when the primary SIM/eSIM is connected to the primary wireless network and using a legacy network for a voice connection, e.g., using a circuit-switched fallback (CSFB) connection over a legacy network associated with the primary wireless network, access to services of the secondary wireless network may be possible depending on the type of legacy network is used. When the legacy network supports wideband code division multiple access (WCDMA), access to services of the secondary wireless network may be possible. When the legacy network supports the Global System for Mobile (GSM) communications standard, access to services of the secondary wireless network may be not possible. In case 6, when the primary SIM/eSIM is attached to and idle on the primary wireless network, which is a UMTS wireless network, access to services of the secondary wireless network is possible. In case 7, when the primary SIM/eSIM is connected to the primary wireless network, which is a high speed packet access (HSPA) wireless network, access to services of the secondary wireless network is possible. In case 8, when the primary SIM/eSIM is connected to the primary wireless network via a WCDMA voice connection over a first radio bearer, access to services of the secondary wireless network is possible when a second radio bearer can be established, e.g., when a multiple radio access bearer (multi-RAB) connection to the first wireless network is possible. In case 9, when the primary SIM/eSIM is attached to and idle on the first wireless network, which is a GSM wireless network, access to services of the secondary wireless network is possible. In case 10, when the primary SIM/eSIM is attached to and connected via an enhanced general packet radio service (EGPRS) connection, access to services of the secondary wireless network is possible. In case 11, when the primary SIM/eSIM is attached to and connected via a GSM voice connection to the primary wireless network, access to services of the secondary wireless network may be not possible.

Generally, access to services of the secondary wireless network through a radio access network (RAN) of the primary wireless network can require an ability to establish a data connection via the RAN of the primary wireless network to the secondary wireless network and to register for services of the secondary wireless network, such as registering with the IMS server. When the primary wireless network only supports circuit-switched voice connections and no data connections, such as a legacy 2G GSM only wireless network, access to services of the secondary wireless network may be unavailable as no data connection may be able to be established.

Figure 6:
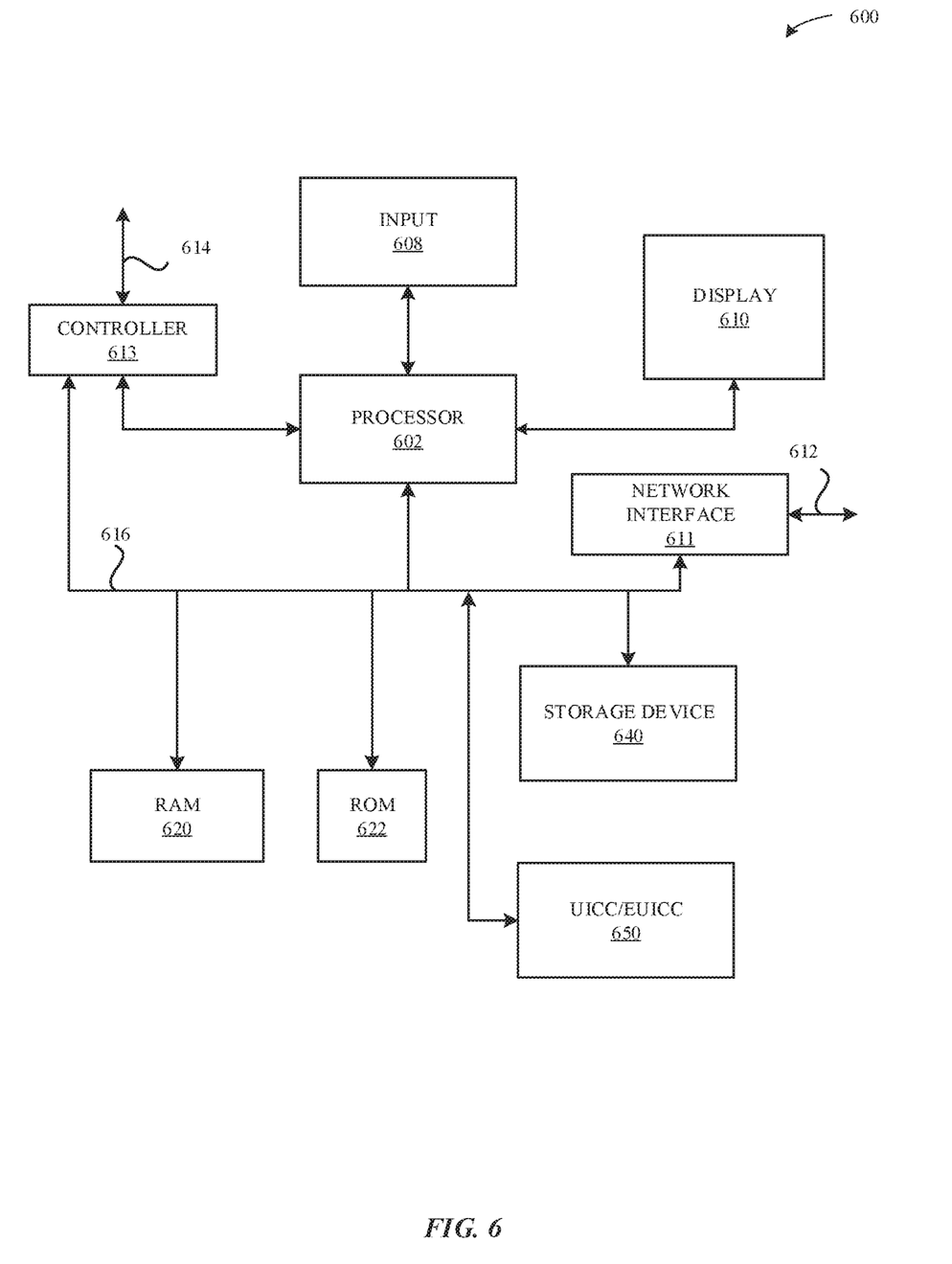
FIG. 6 an example set of components of a wireless communication device, in accordance with some embodiments.

FIG. 6 illustrates a detailed view of a computing device 600 that can be used to implement the various components described herein, according to some embodiments. In particular, the detailed view illustrates various components that can be included in the wireless communication devices illustrated in FIGS. 1-3 and/or described herein. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

REPRESENTATIVE EMBODIMENTS

In some embodiments, a method to access services of multiple wireless networks by a wireless device includes the wireless device: (i) attaching to a primary wireless network using a primary subscriber identity module (SIM) or electronic SIM (eSIM) via a radio access network (RAN) of the primary wireless network; (ii) establishing a context for Internet Protocol (IP) network data connections using the primary SIM or eSIM; (iii) establishing a packet data network (PDN) connection via the RAN of the primary wireless network to a gateway of a secondary wireless network using a secondary SIM or eSIM; and (iv) registering for access to services of the secondary wireless network with a server of the secondary wireless network using the secondary SIM or eSIM.

In some embodiments, the wireless device includes a removable universal integrated circuit card (UICC) that stores the secondary SIM or eSIM and an embedded UICC (eUICC) that stores the primary SIM or eSIM. In some embodiments, the method further includes the wireless device accessing the services of the secondary wireless network via the RAN of the primary wireless network. In some embodiments, the wireless device establishes the context for IP network data connections using an access point name (APN) for a PDN gateway of the primary wireless network. In some embodiments, the wireless device establishes the PDN connection to the gateway of the secondary wireless network through the PDN gateway of the primary wireless network. In some embodiments, the gateway of the secondary wireless network includes an evolved packet data gateway (ePDG) that interconnects a core network of the secondary wireless network for IP network data connections to access services of the core network of the secondary wireless network. In some embodiments, the server of the secondary wireless network includes an IP multimedia subsystem (IMS) server. In some embodiments, the primary wireless network includes a Long Term Evolution (LTE) or LTE-Advanced wireless network, and the secondary wireless network includes a non-LTE wireless network. In some embodiments, the method further includes the wireless device simultaneously accessing services of the primary wireless network using a first connection via the RAN of the primary wireless network, and accessing services of the secondary wireless network using the PDN connection to the secondary wireless network via the RAN of the primary wireless network.

In some embodiments, a wireless device configured for access to services of a secondary wireless network via a radio access network of a primary wireless network includes: (i) wireless circuitry configurable to communicate via a first wireless access network; (ii) one or more processors communicatively coupled to the wireless circuitry; and (iii) a memory communicatively coupled to the one or more processors, where the one or more processors are configured to execute instructions stored in the memory to cause the wireless device to: (a) attach to the primary wireless network using a primary electronic subscriber identity module (eSIM) via a radio access network (RAN) of the primary wireless network; (b) establish a context for Internet Protocol (IP) network data connections using the primary eSIM; (c) establish a packet data network (PDN) connection via the RAN of the primary wireless network to a gateway of the secondary wireless network using a secondary SIM or eSIM; (d) register for access to services of the secondary wireless network with a server of the secondary wireless network using the secondary SIM or eSIM; and (e) access the services of the secondary wireless network via the RAN of the primary wireless network.

In some embodiments, the wireless device includes a removable universal integrated circuit card (UICC) that stores the secondary SIM or eSIM, and an embedded UICC (eUICC) that stores the primary eSIM. In some embodiments, the wireless device establishes the context for IP network data connections using an access point name (APN) for a PDN gateway of the primary wireless network. In some embodiments, the wireless device establishes the PDN connection to the gateway of the secondary wireless network through the PDN gateway of the primary wireless network. In some embodiments, the server of the secondary wireless network includes an IP multimedia subsystem (IMS) server. In some embodiments, execution of the instructions further causes the wireless device to simultaneously accessing services of the secondary wireless network using the PDN connection to the secondary wireless network via the RAN of the primary wireless network while accessing the services of the primary wireless network via the RAN of the primary wireless network.

In some embodiments, an apparatus configurable for operation in a wireless device includes one or more processors communicatively coupled to a memory storing instructions that when executed cause the wireless device to: (i) attach to a primary wireless network using a primary electronic subscriber identity module (eSIM) of an embedded universal integrated circuit card (eUICC) via the radio access network (RAN) of the primary wireless network; (ii) establish a context for Internet Protocol (IP) network data connections using the primary eSIM; (iii) establish a packet data network (PDN) connection via the RAN of the primary wireless network to a gateway of a secondary wireless network using a secondary SIM of a removable universal integrated circuit card (UICC); (iv) register for access to services of the secondary wireless network with a server of the secondary wireless network using the secondary SIM; and (v) access services of the secondary wireless network via the RAN of the primary wireless network.

In some embodiments, the apparatus causes the wireless device to establish the context for IP network data connections using an access point name (APN) for a PDN gateway of the primary wireless network. In some embodiments, the apparatus causes the wireless device to establish the PDN connection to the gateway of the secondary wireless network through the PDN gateway of the primary wireless network. In some embodiments, the server of the secondary wireless network includes an IP multimedia subsystem (IMS) server. In some embodiments, execution of the instructions further causes the wireless device to simultaneously access services of the secondary wireless network using the PDN connection to the secondary wireless network via the RAN of the primary wireless network while accessing the services of the primary wireless network via the RAN of the primary wireless network.

The computing device 600 also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600. The computing device 600 can further include a UICC/eUICC 650 that can store one or more SIMs and/or eSIMs.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to access services of multiple wireless networks by a wireless device, the method comprising:
  by the wireless device:
    attaching to a primary wireless network using a primary subscriber identity module (SIM) or electronic SIM (eSIM) via a radio access network (RAN) of the primary wireless network;
    establishing a packet data protocol (PDP) context for Internet Protocol (IP) network data connections using the primary SIM or eSIM, the PDP context established using an access point name (APN) reserved for Internet access via the primary wireless network and separate from an APN reserved for IP multimedia subsystem (IMS) service for the primary wireless network;

establishing a packet data network (PDN) connection via the RAN of the primary wireless network to a gateway of a secondary wireless network using a secondary SIM or eSIM; and registering for access to services of the secondary wireless network with a server of the secondary wireless network via the PDN connection using the secondary SIM or eSIM, wherein cellular wireless circuitry of the wireless device is incompatible with a radio access technology (RAT) of the secondary wireless network and is incapable of establishing connections using the secondary SIM or eSIM via one or more RANs of the secondary wireless network.

2. The method of claim 1, wherein the wireless device comprises:
a removable universal integrated circuit card (UICC) that stores the secondary SIM or eSIM; and
an embedded UICC (eUICC) that stores the primary SIM or eSIM.

3. The method of claim 1, further comprising:
by the wireless device:
accessing the services of the secondary wireless network via the RAN of the primary wireless network.

4. The method of claim 1, wherein the wireless device establishes the PDN connection to the gateway of the secondary wireless network through the PDN gateway of the primary wireless network.

5. The method of claim 1, wherein the gateway of the secondary wireless network comprises an evolved packet data gateway (ePDG) that interconnects a core network of the secondary wireless network for IP network data connections to access services of the core network of the secondary wireless network.

6. The method of claim 1, wherein the server of the secondary wireless network comprises an IMS server.

7. The method of claim 1, wherein:
the primary wireless network comprises a Long Term Evolution (LTE) or LTE-Advanced wireless network; and
the secondary wireless network comprises a non-LTE wireless network.

8. The method of claim 1, further comprising:
by the wireless device simultaneously:
accessing services of the primary wireless network using a first connection via the RAN of the primary wireless network; and
accessing services of the secondary wireless network using the PDN connection to the secondary wireless network via the RAN of the primary wireless network.

9. A wireless device configured for access to services of a secondary wireless network via a radio access network (RAN) of a primary wireless network, the wireless device comprising:
wireless circuitry configurable to communicate via a first wireless access network;
one or more processors communicatively coupled to the wireless circuitry; and
a memory communicatively coupled to the one or more processors,
wherein the one or more processors are configured to execute instructions stored in the memory to cause the wireless device to:
attach to the primary wireless network using a primary electronic subscriber identity module (eSIM) via the RAN of the primary wireless network;
establish a packet data protocol (PDP) context for Internet Protocol (IP) network data connections using the primary eSIM, the PDP context established using an access point name (APN) reserved for Internet access via the primary wireless network and separate from an APN reserved for IP multimedia subsystem (IMS) service for the primary wireless network;
establish a packet data network (PDN) connection via the RAN of the primary wireless network to a gateway of the secondary wireless network using a secondary SIM or eSIM;
register for access to services of the secondary wireless network with a server of the secondary wireless network via the PDN connection using the secondary SIM or eSIM; and
access the services of the secondary wireless network via the RAN of the primary wireless network,
wherein cellular wireless circuitry of the wireless device is incompatible with a radio access technology (RAT) of the secondary wireless network and is incapable of establishing connections using the secondary SIM or eSIM via one or more RANs of the secondary wireless network.

10. The wireless device of claim 9, further comprising:
a removable universal integrated circuit card (UICC) that stores the secondary SIM or eSIM; and
an embedded UICC (eUICC) that stores the primary eSIM.

11. The wireless device of claim 9, wherein the wireless device establishes the PDN connection to the gateway of the secondary wireless network through the PDN gateway of the primary wireless network.

12. The wireless device of claim 9, wherein the server of the secondary wireless network comprises an IMS server.

13. The wireless device of claim 9, wherein execution of the instructions further causes the wireless device to:
simultaneously accessing services of the secondary wireless network using the PDN connection to the secondary wireless network via the RAN of the primary wireless network while accessing the services of the primary wireless network via the RAN of the primary wireless network.

14. An apparatus configurable for operation in a wireless device, the apparatus comprising:
one or more processors communicatively coupled to a memory storing instructions that when executed cause the wireless device to:
attach to a primary wireless network using a primary electronic subscriber identity module (eSIM) of an embedded universal integrated circuit card (eUICC) via a radio access network (RAN) of the primary wireless network;
establish a packet data protocol (PDP) context for Internet Protocol (IP) network data connections using the primary eSIM, the PDP context established using an access point name (APN) reserved for Internet access via the primary wireless network and separate from an APN reserved for IP multimedia subsystem (IMS) service for the primary wireless network;

establish a packet data network (PDN) connection via the RAN of the primary wireless network to a gateway of a secondary wireless network using a secondary SIM of a removable universal integrated circuit card (UICC);

register for access to services of the secondary wireless network with a server of the secondary wireless network via the PDN connection using the secondary SIM; and access services of the secondary wireless network via the RAN of the primary wireless network, wherein cellular wireless circuitry of the wireless device is incompatible with a radio access technology (RAT) of the secondary wireless network and is incapable of establishing connections using the secondary SIM via one or more RANs of the secondary wireless network.

15. The apparatus of claim 14, wherein the apparatus causes the wireless device to establish the PDN connection to the gateway of the secondary wireless network through the PDN gateway of the primary wireless network.

16. The apparatus of claim 14, wherein the server of the secondary wireless network comprises an IMS server.

17. The apparatus of claim 14, wherein execution of the instructions further causes the wireless device to:

simultaneously access services of the secondary wireless network using the PDN connection to the secondary wireless network via the RAN of the primary wireless network while accessing the services of the primary wireless network via the RAN of the primary wireless network.

* * * * *